No. 695,801. Patented Mar. 18, 1902.
W. S. DILLON.
CONFECTIONERY MACHINE.
(Application filed Dec. 19, 1901.)
(No Model.)
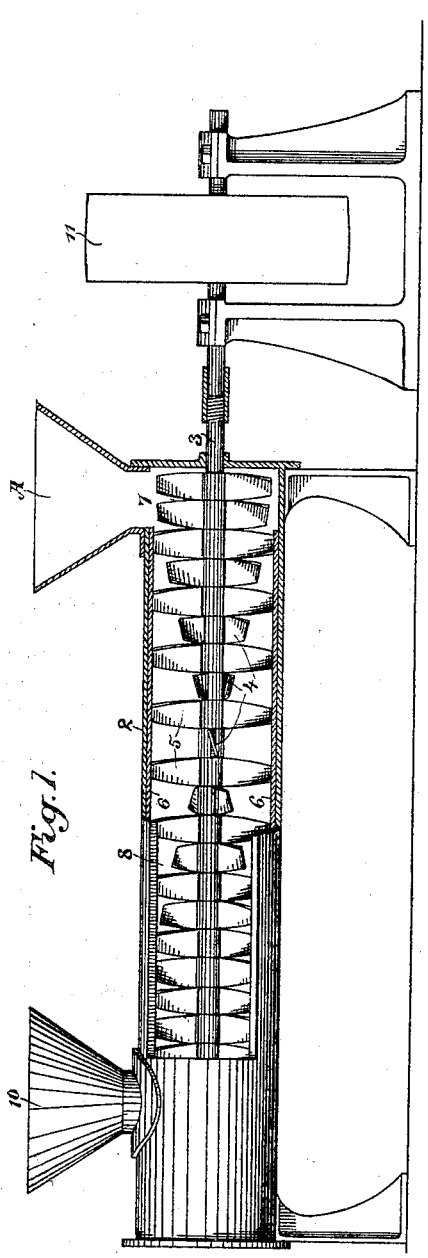
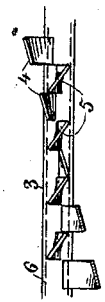
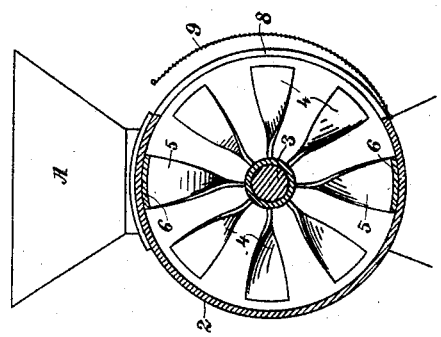
Witnesses,
Inventor,
William S. Dillon
By Dewey Strong & Co
Atty

United States Patent Office.

WILLIAM S. DILLON, OF SAN FRANCISCO, CALIFORNIA.

CONFECTIONERY-MACHINE.

SPECIFICATION forming part of Letters Patent No. 695,801, dated March 18, 1902.

Application filed December 19, 1901. Serial No. 86,543. (No model.)

*To all whom it may concern:*

Be it known that I, WILLIAM S. DILLON, a citizen of the United States, residing in the city and county of San Francisco, State of California, have invented an Improvement in Confectionery-Machines; and I hereby declare the following to be a full, clear, and exact description of the same.

My invention relates to a machine for the manufacture of certain kinds of confectionery. It is especially designed for the making of what is known as "sugar-cream."

It consists of an exterior casing, a series of centrally-journaled revoluble blades, and a series of fixed blades to operate in unison therewith, one set of blades having a right spiral and the other having a left spiral. The casing has an opening for the admission of air, so that when the revoluble shaft is turned and the prepared material is fed into one end of the machine it is continually worked as it passes through the casing and between the movable and stationary blades and delivered at the proper cream-like consistency at the discharge end.

Referring to the accompanying drawings, Figure 1 is a side elevation of the machine, partly shown in section. Fig. 2 is a central cross-section of the same. Fig. 3 is a top view of the blades, showing their relative positions.

The apparatus may be made of any suitable or desired size. If made large enough to work about one hundred and twenty-five pounds or eleven gallons of material at a batch, it will consist of a hopper A of sufficient size to receive the material and a casing 2 about six inches in diameter by about three feet long. This casing may be made of galvanized sheet-iron of sufficient thickness, and it may be made cylindrical or rectangular, if preferred, since the peculiar operation of the blades within the casing is such that the material does not come into contact with the casing to any extent. Longitudinally through this casing extends a shaft 3, and upon this shaft are fixed the blades 4, having a spiral twist given to their outer ends. 5 represents similar blades fixed to an interior support, such as bars 6, which extend from end to end through the casing, and these blades are twisted in a reverse direction from the blades 4. Thus the blades 4 may have a right spiral twist and the blades 5 may have a left spiral twist.

From the bottom of the hopper A an open connection 7 allows the material to be gradually fed into the receiving end of the apparatus, and at the point where the material enters the casing there are blades so fixed as to feed the material along the apparatus and deliver it to the first of the propeller-blades.

The material upon which the machine is to operate is sugar mixed with cream of tartar, or such ingredients as the particular preparation requires, and this after being boiled to the proper consistency and cooled upon a marble slab to a certain degree is then placed in the hopper and subjected to this apparatus. The rotation of the shaft causes the material to be fed forward, where it is acted upon alternately by the right and left revoluble and stationary blades and delivered continuously from one set of blades to another until it reaches the end of the machine.

The side of the machine is made open, as shown at 8, and may also be provided with a screen, as 9, to prevent accidents. Through this opening the air is freely admitted, and the effect of the air, together with the continued working of the material, finally produces the creamy consistency desired for the preparation of certain classes of confectionery known as "creams." The action prevents the granulation of the sugar, which would otherwise occur if it was allowed to cool in the usual manner.

Power may be applied to the revoluble part of the apparatus by a crank or any suitable connection with the shaft. I have here shown a pulley 11, which may be independently mounted, and its shaft may be connected in any suitable manner, so that the shaft carrying the blades can be disengaged and removed for the purpose of cleansing it whenever desired.

Eggs, gelatin, or other material are often added in the manufacture when the material reaches a certain point. These may be thrown in through the opening 8, or, if preferred, a second hopper 10 or feed-opening may be located at the proper point on the machine.

Having thus described my invention, what

I claim, and desire to secure by Letters Patent, is—

1. An apparatus for the manufacture of sugar-cream consisting of a casing having an open side extending the greater portion of its length, for the admission of air, said casing having fixed spirally-twisted blades, a shaft extending axially through said casing, having oppositely-twisted spiral blades fixed to and revoluble with it contiguous to the stationary blades.

2. An apparatus for the manufacture of sugar-cream consisting of a casing having spiral blades fixed radially therein at intervals from one end to the other, an axially-revoluble shaft having oppositely-twisted spiral blades revoluble therewith contiguous to the fixed blades, an opening extending from end to end of the casing for the admission of air and a hopper with open connection through which material is delivered into the receiving end of the casing.

3. An apparatus for the manufacture of sugar-cream consisting of an exterior casing, a stationary frame supported therein, having spirally-twisted blades fixed thereto and extending approximately radial from side to side, an axially-revoluble shaft extending through the casing having blades fixed thereto contiguous to the stationary blades and oppositely twisted therefrom, a hopper located at one end and an opening through which material is delivered into the casing and carried from one end to the other by the action of the blades, and an opening extending from end to end of the casing whereby air is admitted to the moving material which is being acted upon by the blades.

4. In an apparatus for the manufacture of confectionery a casing having a wall slotted for the greater portion of its length, for the admission of air, said casing having internally-fixed spirally-twisted and approximately-radial blades, a shaft carrying oppositely-twisted blades contiguous to the fixed ones, a driving-shaft journaled in line with said shaft, and a detachable coupling.

In witness whereof I have hereunto set my hand.

WILLIAM S. DILLON.

Witnesses:
S. H. NOURSE,
JESSIE C. BRODIE.